(12) United States Patent
Levi

(10) Patent No.: US 12,523,044 B1
(45) Date of Patent: Jan. 13, 2026

(54) HANDRAIL CONNECTOR

(71) Applicant: Jonathan Levi, Boston, MA (US)

(72) Inventor: Jonathan Levi, Boston, MA (US)

( * ) Notice: Subject to any disclaimer, the term of this patent is extended or adjusted under 35 U.S.C. 154(b) by 0 days.

(21) Appl. No.: 19/225,229

(22) Filed: Jun. 2, 2025

(51) Int. Cl.
*E04F 11/18* (2006.01)

(52) U.S. Cl.
CPC ................................ *E04F 11/184* (2013.01)

(58) Field of Classification Search
CPC ............... E04F 11/1804; E04F 11/1808; E04F 11/1836; E04F 11/1838; E04F 11/184; E04F 2011/1827; E04F 2011/1868; E04F 2011/1885; E04F 2011/1897; F16B 7/0406; F16B 7/0413; F16B 7/044; F16B 7/0446; Y10T 403/255; Y10T 403/257; Y10T 403/259; Y10T 403/47; Y10T 403/471; Y10T 403/472; Y10T 403/473; Y10T 403/475; Y10T 403/49; Y10T 403/55; Y10T 403/555; Y10T 403/57; Y10T 403/5753
USPC ..... 256/65.01, 65.15, 65.16; 403/37, 38, 39, 403/265, 266, 267, 268, 269, 274, 292, 403/295, 300, 308
See application file for complete search history.

(56) References Cited

U.S. PATENT DOCUMENTS

| | | | | | |
|---|---|---|---|---|---|
| 2,930,634 | A | * | 3/1960 | Merritt | ................... B29C 65/024 156/499 |
| 2,992,457 | A | * | 7/1961 | Harrison | ............. B29C 66/1142 29/447 |
| 3,847,694 | A | * | 11/1974 | Stewing | ................... F16L 47/06 156/303.1 |
| 3,920,268 | A | * | 11/1975 | Stewing | ................... B29C 65/42 138/155 |
| 3,991,243 | A | * | 11/1976 | Biddell | ............... B29C 65/4835 156/203 |
| 4,630,959 | A | * | 12/1986 | Glaser | ................. E06B 3/67317 403/292 |
| 5,286,952 | A | * | 2/1994 | McMills | ................. B29C 66/71 285/21.2 |
| 5,657,968 | A | * | 8/1997 | Marsden | ............... E04F 11/184 256/65.16 |
| 6,494,438 | B1 | * | 12/2002 | Noirot | ................. E04F 11/1814 256/60 |
| 9,617,735 | B2 | * | 4/2017 | Jozwiak | ............. E04F 11/1804 |

(Continued)

FOREIGN PATENT DOCUMENTS

DE            1004361 B   *  3/1957  ......... E04F 11/1836

*Primary Examiner* — Josh Skroupa
(74) *Attorney, Agent, or Firm* — Nutter McClennen & Fish LLP

(57) ABSTRACT

A handrail connector may include a hollow lengthwise member configured to retain flexibility when empty, a first sleeve having first and second sleeve ends, and a second sleeve having third and fourth sleeve ends. The member has first and second opposing ends and a side surface, the first end having a first hole proximate the side surface, the second end having a second hole proximate the side surface. The first sleeve end couples with the first end of the member and the second sleeve end couples with a first handrail. The third sleeve end couples with the second end of the member and the fourth sleeve end couples with a second handrail. The member is configured to become more rigid when a liquid compound injected into the first hole fills the second hole and hardens.

20 Claims, 13 Drawing Sheets

(56) References Cited

U.S. PATENT DOCUMENTS

2016/0102694 A1\* 4/2016 Gernentz .............. F16B 11/008
                                                        403/268
2018/0179781 A1\* 6/2018 Munro ................ E04F 11/1836

\* cited by examiner

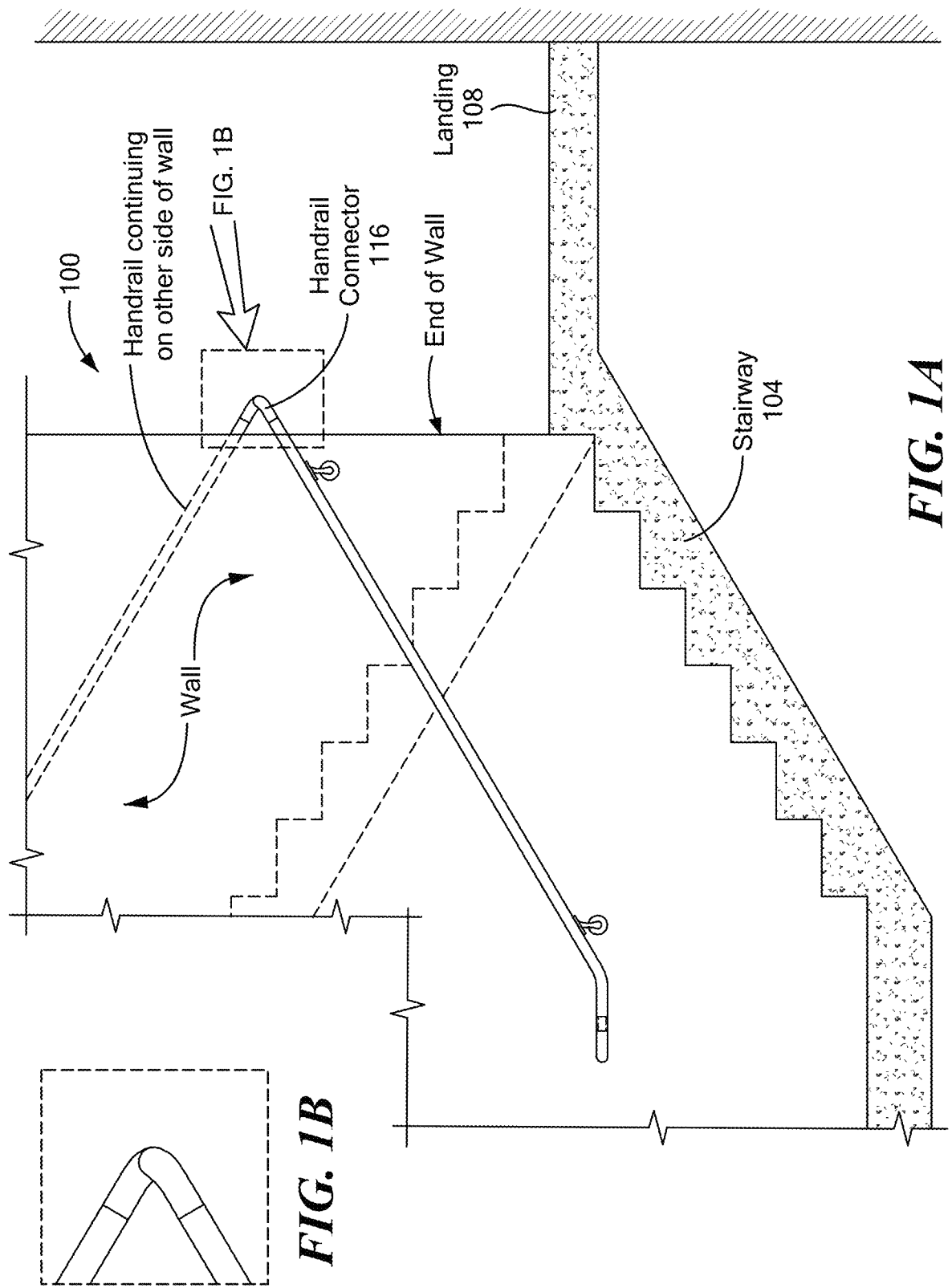

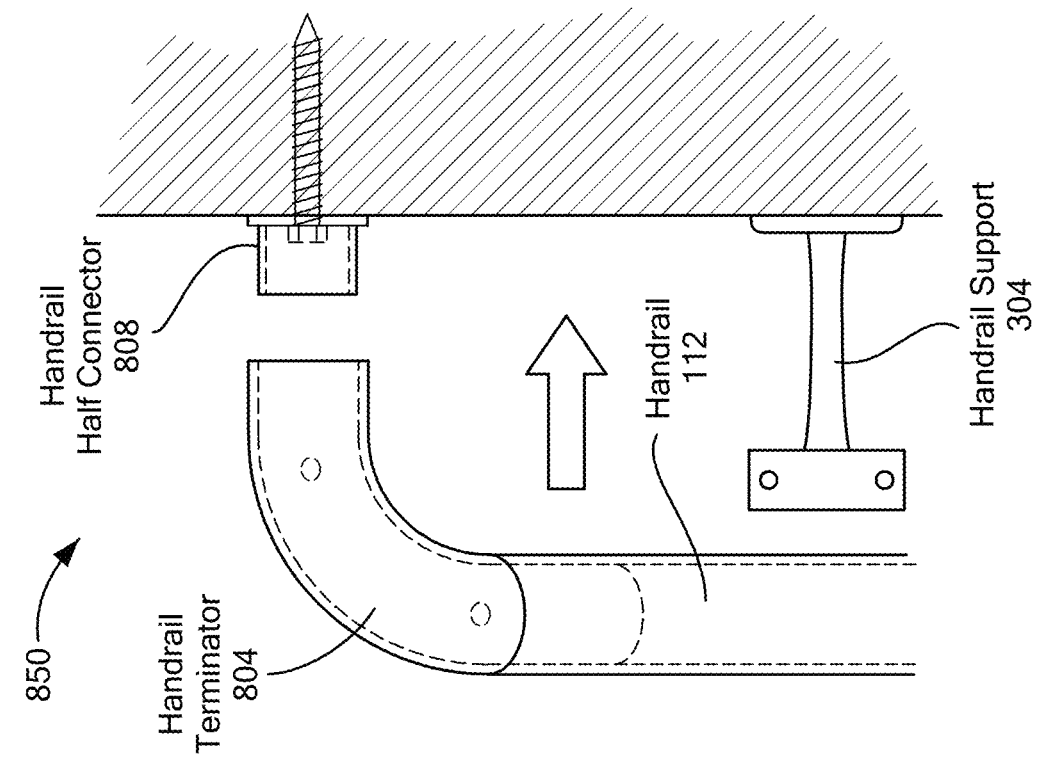
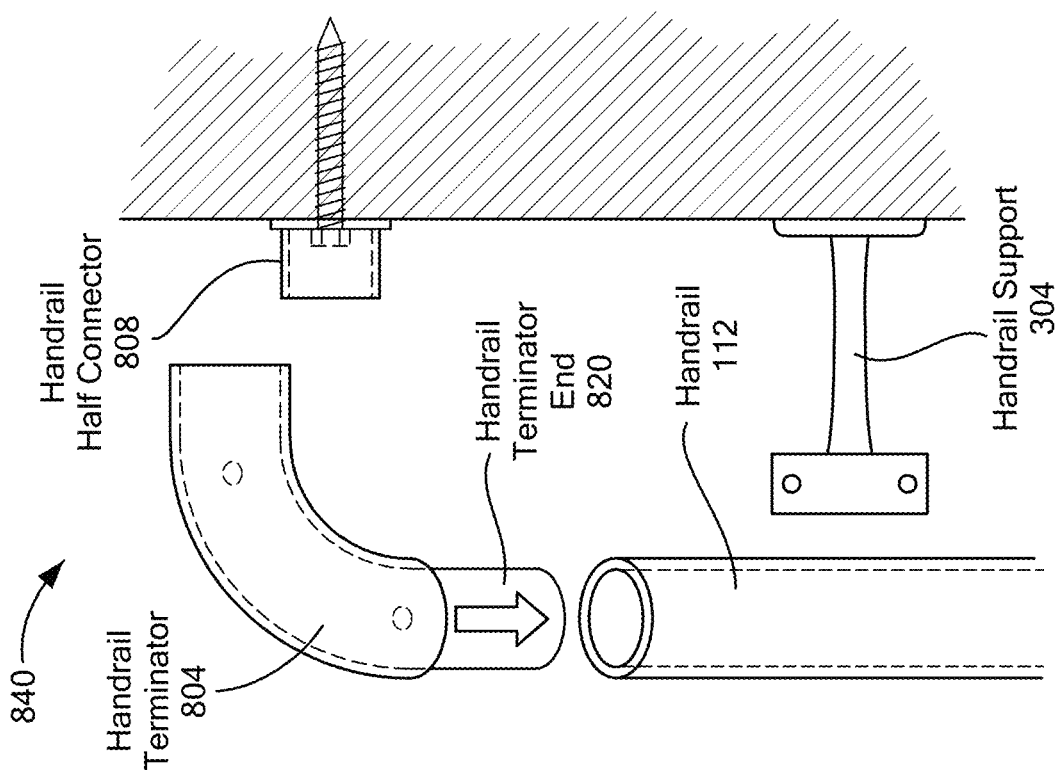

HANDRAIL CONNECTOR

FIELD

Illustrative embodiments generally relate to architecture and, more particularly, various embodiments of the invention relate to construction and installation of handrail transitions and terminations.

BACKGROUND

Typically, a stairway must include one or more handrails which by universal access and other codes is required to be smoothly continuous. In all cases, stairway installers must custom fabricate the transition between a first handrail to a second handrail, for example, in a dogleg stairway. Due to construction constraints, this fabrication is performed off site in a specialist metal fabrication shop. This can be cumbersome and time consuming in a large building that includes multiple handrail sections and transitions.

SUMMARY OF VARIOUS EMBODIMENTS

In accordance with one embodiment of the invention, a handrail connector for coupling to first and second handrails may include a hollow lengthwise member configured to retain flexibility when empty, the member having first and second opposing ends and a side surface, the first end having a first hole proximate the side surface, the second end having a second hole proximate the side surface, a first sleeve having a first sleeve end and a second sleeve end, the first sleeve end configured to couple with the first end of the member, the second sleeve end configured to couple with the first handrail, and a second sleeve having a third sleeve end and a fourth sleeve end, the third sleeve end configured to couple with the second end of the member, the fourth sleeve end configured to couple with the second handrail, where the member is configured to become more rigid than when empty in response to a liquid compound injected into the first hole fills the second hole and hardens.

In accordance with other embodiments, the member may include an inner reinforcement mesh within the member, configured to allow the liquid compound to flow within the mesh, permit the member to be bent in one or more directions, maintain a cross sectional shape of the member, and preserve the bend directions prior to the liquid compound is injected.

In accordance with other embodiments, the handrail connector may include a pair of flush caps, configured to plug each of the first and the second holes.

In accordance with other embodiments, the caps are not secured to the first and the second holes until the liquid compound is observed within the second hole.

In accordance with other embodiments, the sleeves are made from a rigid material.

In accordance with other embodiments, the fourth sleeve end of the second sleeve is configured to be retained in an internal half connector coupled to a wall instead of the end of the second handrail.

In accordance with other embodiments, the member may have one of a textured external surface and a resilient sleeve affixed to a portion of the external surface.

In accordance with other embodiments, a handrail connector may include a hollow lengthwise member configured to retain flexibility when empty. The hollow lengthwise member may include a central portion, which includes a pair of holes proximate to opposite ends of the central portion and disposed in a side surface of the central portion, a first sleeve portion of a reduced cross section compared with the central portion, extending from a first end of the central portion and configured to be received in an end of a first handrail, and a second sleeve portion of a reduced cross section compared with the central portion, extending from an opposite second end of the central portion. The member is configured to become more rigid than when empty in response to a liquid compound injected into one of the pair of holes fills the other of the pair of holes and hardens.

In accordance with other embodiments, a method may include coupling an inner end of a pair of sleeves to each end of a hollow lengthwise member, the member including a pair of holes proximate to opposite ends of the member and disposed in a side surface of the member, bending the member in one or more directions to align outer ends of the pair of sleeves with a first receiver in an end of a first handrail and a second receiver, coupling an outer end of each of the pair of sleeves to the first and the second receivers, and injecting a liquid compound into one of the pair of holes until it fills the other of the pair of holes and hardens.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 1A schematically shows a side view of a multi-floor (e.g., dogleg) stairway and handrail with intervening wall in accordance with illustrative embodiments of the invention.

FIG. 1B schematically shows an inset drawing of a handrail connector in accordance with illustrative embodiments of the invention.

FIG. 8C schematically shows a handrail terminator end installed to a handrail in accordance with illustrative embodiments of the invention.

FIG. 8D schematically shows an assembled plan view of a wall termination of a handrail terminator in accordance with illustrative embodiments of the invention.

DESCRIPTION OF ILLUSTRATIVE EMBODIMENTS

Figure 1C:
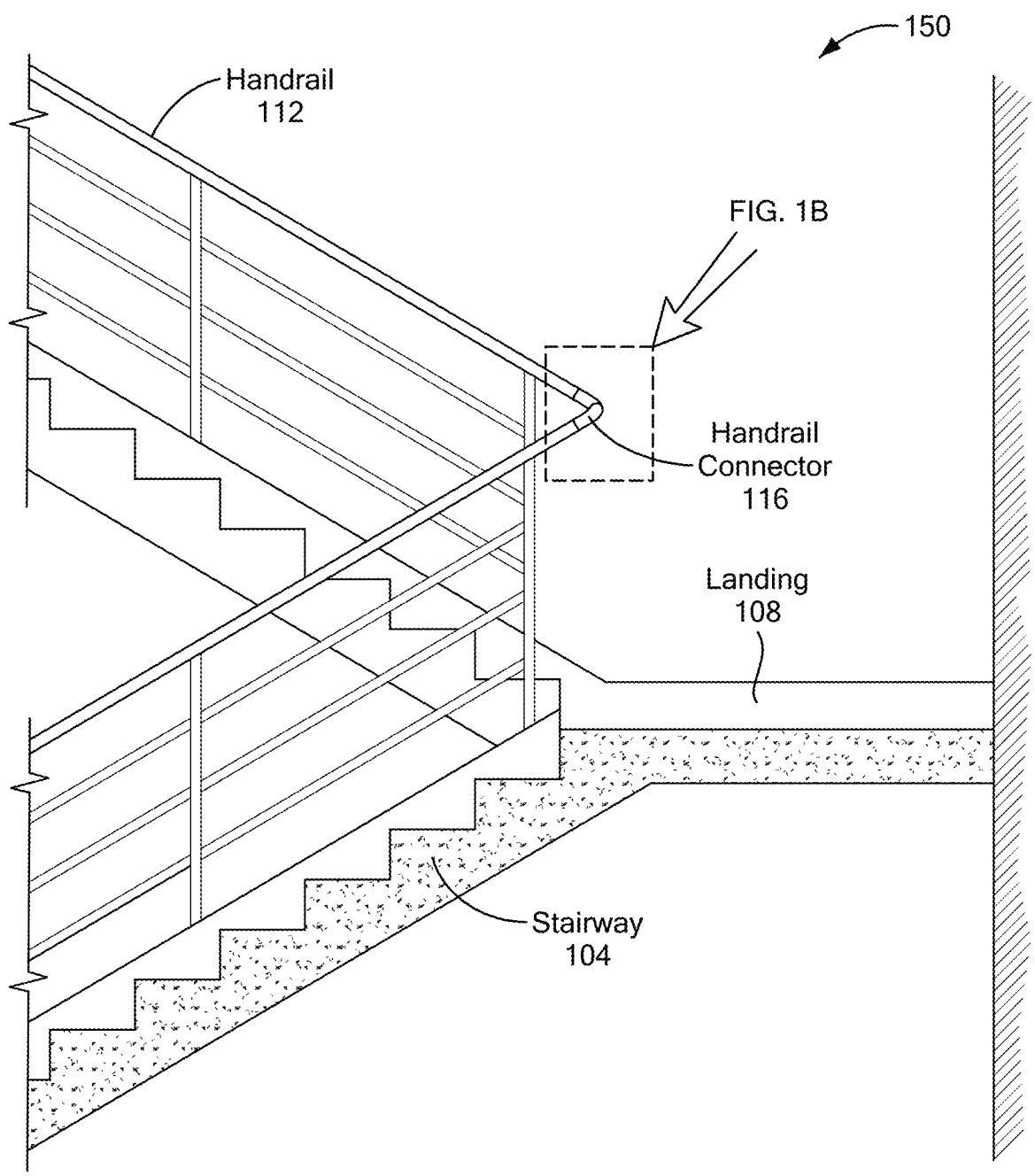
FIG. 1C schematically shows a side view of a multi-floor (e.g., dogleg) stairway and handrail in accordance with illustrative embodiments of the invention.

Typically, when a stairway installer installs stairs, the installer also installs one or more corresponding handrails. In illustrative embodiments, a stairway may include one or more handrails to facilitate safe movement of people up and down stairs. Handrails are typically secured to a wall adjacent to the stairs. Handrails are also frequently installed to walls along paths, walkways, and promenades. Walking ramps also frequently include handrails to facilitate safe walking by those using walkers, wheelchairs, or other mobility assistance devices. Handrails are often required by building codes to be routed around pillars and other forms of vertical structures or wall projections.

In some cases, e.g., a multi-story building or geometrically complex stairway, the handrail may need to follow a contour of the stairway. The contour may be extremely complex in an ornate stairway, or transition from floor-to-floor in a multi-story building. Handrail sections are typically fabricated in continuous units off site. Off-site custom fabrication of handrail connectors may be both repetitive and cumbersome, and often may have a large enough range of dimensions that one-size-fits-all units may be insufficient.

Specifically, in illustrative embodiments, a handrail connector or terminator may be attached to a handrail and formed to any shape as described. Certain illustrative embodiments may include a flexible hollow conduit that may be attached to a handrail and filled with a material that may be injected in a liquid form and hardened. The filled flexible conduit may join two handrails together to provide a continuous handrail, provide necessary slope transitions or serve as a termination to a wall at a start or end of a handrail. Details of the embodiments are discussed below.

FIG. 1A schematically shows a side view of a multi-floor (e.g., dogleg) stairway and handrail with intervening wall 100 in accordance with illustrative embodiments of the invention. As shown in FIG. 1A, a stairway 104 includes a pair of handrail sections 112. A first handrail section 112 proceeds from a lower level of a building to a landing 108 and a second handrail section 112 proceeds from the landing 108 to an upper level of a building. Most of the second handrail section 112 is hidden behind an intervening wall. The first and the second handrail sections 112 are anchored to adjacent walls.

The landing 108 may serve as a transition between stairways 104. Each of the handrail sections 112 are joined by a handrail connector 116. The handrail connector 116 serves as a transition from the first handrail section 112 to the second handrail section 112.

A handrail 112 may continuously follow a contour of a stairway 104 and transition as the stairway 104 does. Typically, these transitions may be complex, and require a custom fabricated handrail connector (not shown) to achieve the transition. On the other hand, in some embodiments a stairway 112 may have a plurality of transitions that are mostly similar (e.g., in the dogleg stairway 100 in the example of FIG. 1A). In these cases, there may be a small amount of variation in handrail 112 positioning where an interchangeable handrail connector 116 is able to fit every handrail 112 transition.

In some embodiments, a stairway 104 may include one or more flights of stairs having an architecturally aesthetic contour. For example, a first flight of stairs may be curved, bifurcated, curved and bifurcated, spiral, straight, quarter-turn, a winder, a half-turn, and/or a ladder. Accordingly, a first handrail 112 may be shaped to match a contour of a first flight of stairs. In some embodiments, handrail connectors 116 may be incorporated at the turn of a quarter-turn, half-turn, or winder flight of stairs.

FIG. 1B schematically shows an inset drawing of a handrail connector 116 in accordance with illustrative embodiments of the invention. FIG. 1B illustrates side details of a handrail connector 116 affixed to a lower handrail 112 and an upper handrail 112. Additional details and other embodiments of handrail connectors 116 are shown and described herein.

FIG. 1C schematically shows a side view of a multi-floor (e.g., dogleg) stairway and handrail 150 in accordance with illustrative embodiments of the invention. As shown in FIG. 1A, a stairway 104 may include a pair of handrail sections 112. A first handrail section 112 proceeds from a lower level of a building to a landing 108 and a second handrail section 112 proceeds from the landing 108 to an upper level of a building. FIG. 1C illustrates stairways 104 where the handrails 112 are anchored to a floor or stairs rather than an adjacent wall. Because of the variation in floor and stair arrangement, this generally means the handrails 112 are custom designed and assembled—which is both costly and time consuming.

In many cases, the handrail transition is required by local laws and/or building codes where the handrail 112 does not terminate into a wall. As such, a handrail 112 may continuously follow a contour of a stairway 104, and transition as the stairway 104 does. Typically, these transitions may be complex, and require a custom fabricated handrail connector (not shown) to achieve the transition. On the other hand, in some embodiments a stairway 112 may have a plurality of transitions that are mostly similar. In these cases, there may be a small amount of variation in handrail 112 positioning where an interchangeable handrail connector 116 is able to fit every handrail 112 transition.

Figure 2:
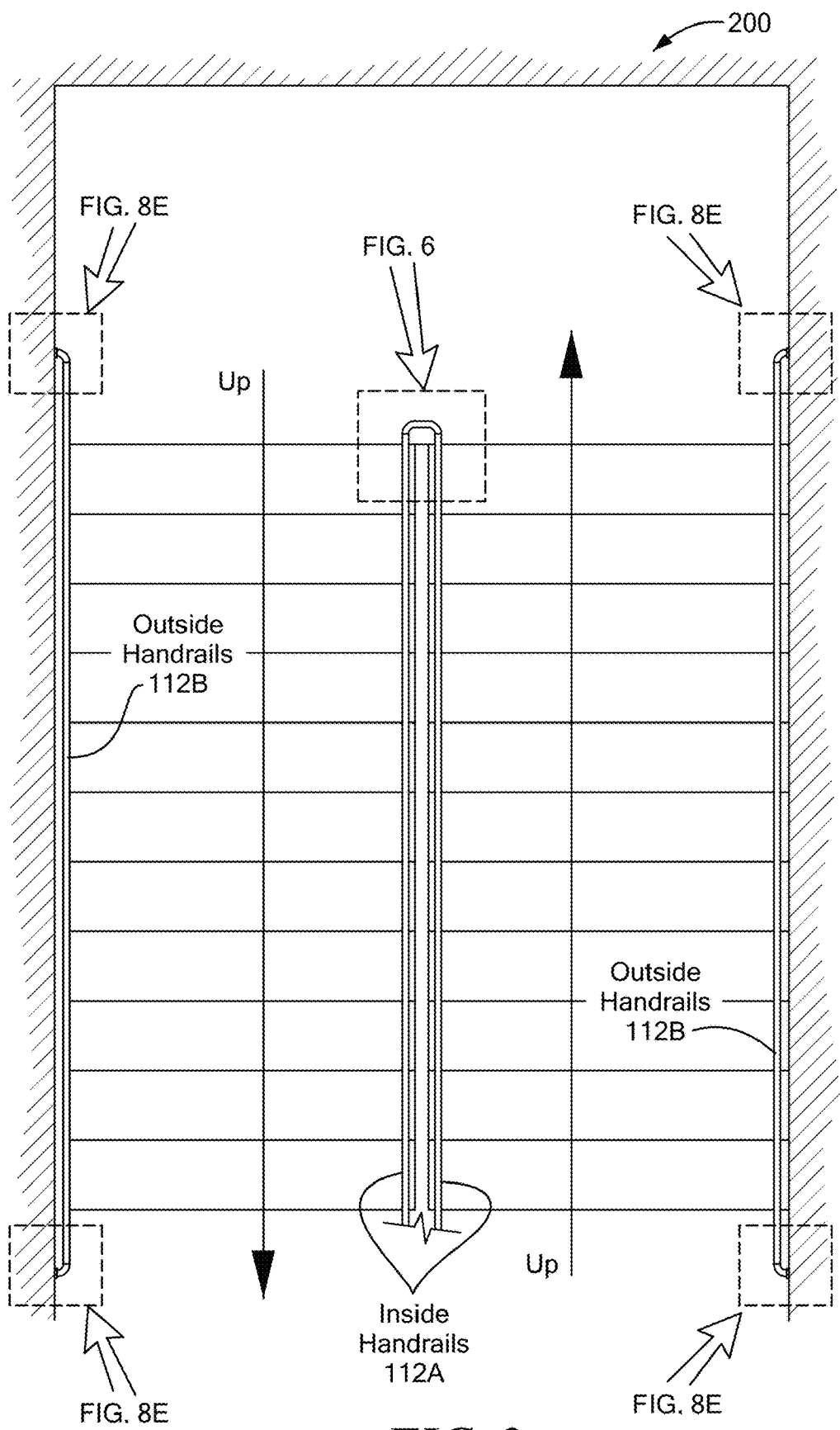
FIG. 2 schematically shows a plan view of a multi-floor stairway and handrail in accordance with illustrative embodiments of the invention.

FIG. 2 schematically shows a plan view of a multi-floor stairway and handrail 200 in accordance with illustrative embodiments of the invention. FIG. 2 illustrates a stairwell that is analogous to FIG. 1A but also shows an additional embodiment. An upward stairway 104 section from a lower level of a building to a landing 108 is on the right while another upward stairway 104 section from the landing 108 to an upper level of the building is shown on the left. Handrail connector 116 appears between inside handrails 112A on the stairway 104 and is shown and described in more detail in FIG. 6. The stairway 104 may also have or require outside handrails 112B for each stairway 104 section. The outside handrails 112B are typically terminated into an adjacent wall. Details of handrail terminations are shown and described in FIGS. 8A-8E.

Figure 3:
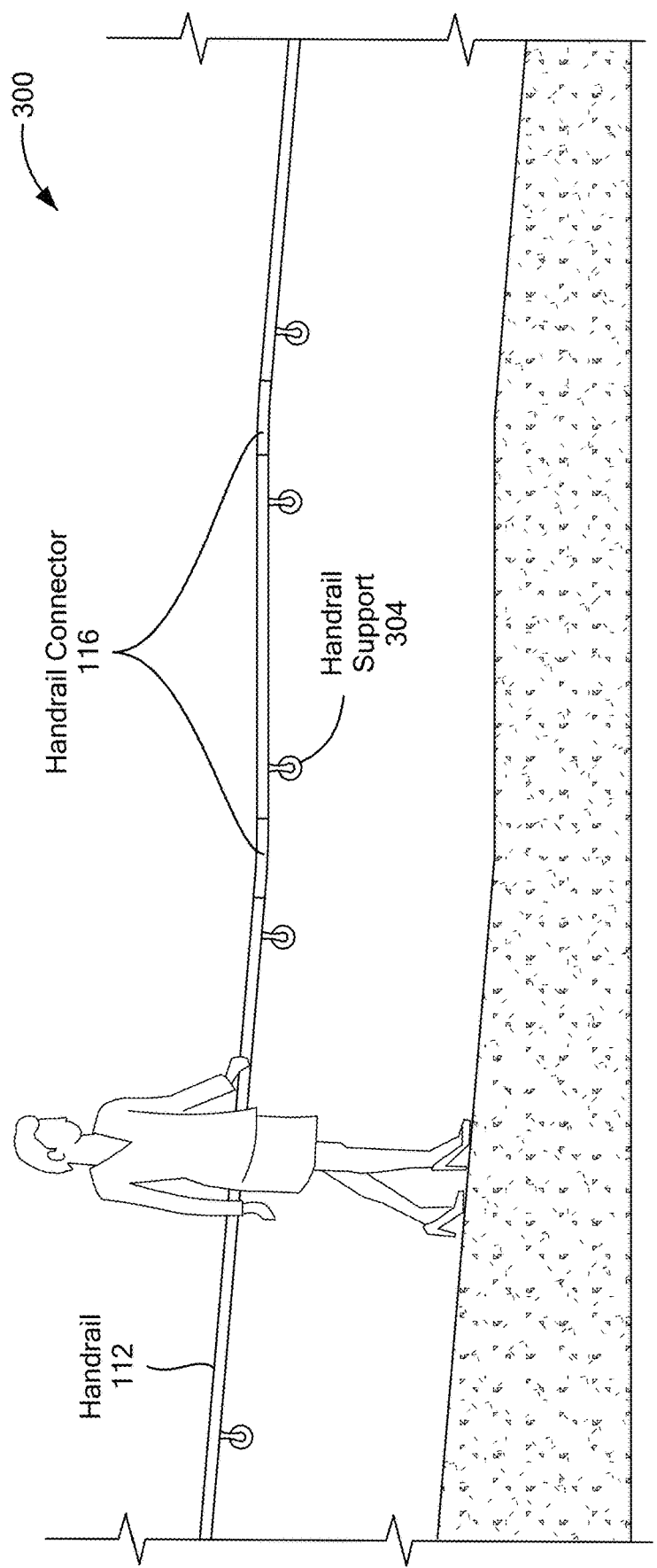
FIG. 3 schematically shows a side view of a sloped walkway and handrail in accordance with illustrative embodiments of the invention.

FIG. 3 schematically shows a side view of a sloped walkway and handrail 300 in accordance with illustrative embodiments of the invention. An individual walks along the walkway 300 and may grasp a handrail 112 with a hand. In one embodiment, the walkway 300 may include handrails 112 on each side of the walkway 300. The handrails 112 generally follow the contour of the walkway 300 and are at a consistent height above the walkway 300.

In one embodiment, the handrail or handrail sections 112 may be supported by a number of conventional wall mounted handrail supports 304. The handrail supports 304 may be regularly spaced along handrails 112 and provide anchors to walls or floors. FIG. 3 illustrates wall anchors as handrail supports 304. Handrail sections 112 are linked by handrail connectors 116.

Figure 4:
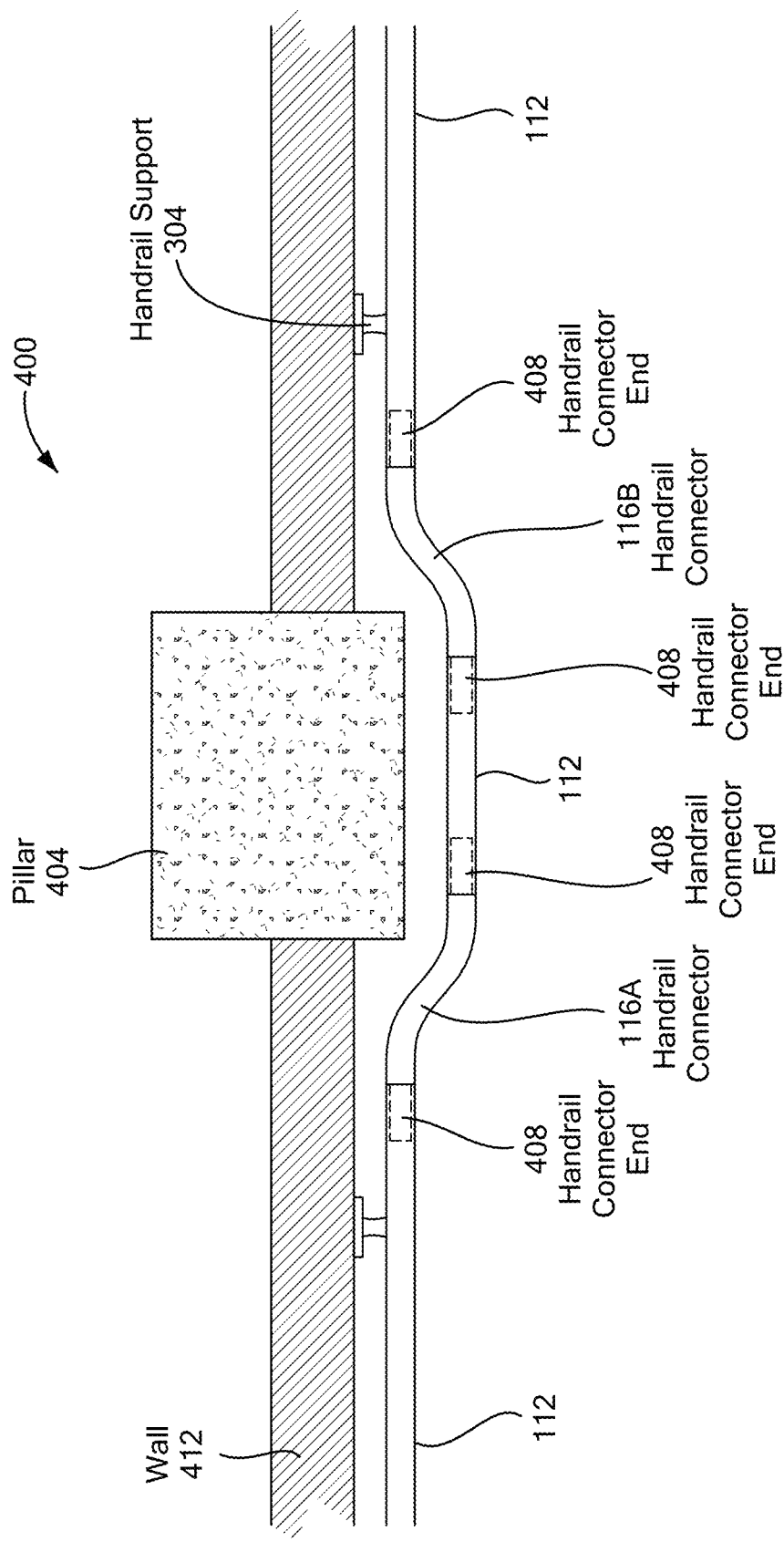
FIG. 4 schematically shows a plan view of an interrupted handrail to accommodate a vertical structure in accordance with illustrative embodiments of the invention.

FIG. 4 schematically shows a plan view of an interrupted handrail to accommodate a vertical structure 400 in accordance with illustrative embodiments of the invention. In some cases, handrails 112 need to be routed around various structures and forms of projections that interrupt an otherwise straight routing of handrails 112. FIG. 4 illustrates a case where handrail sections 112 terminate in the area of a vertical pillar 404. Instead of custom bending a handrail 112 around such a structure it may be easier and faster to install a pair of handrail connectors 116 to link left side and right side handrails 112 at a short central handrail 112 section a consistent distance from the pillar 404 or other structure.

A first handrail connector 116A couples the first handrail section 112 to the central handrail section and a second handrail connector 116B couples the second handrail section 112 to the central handrail section 112.

Figure 5A:
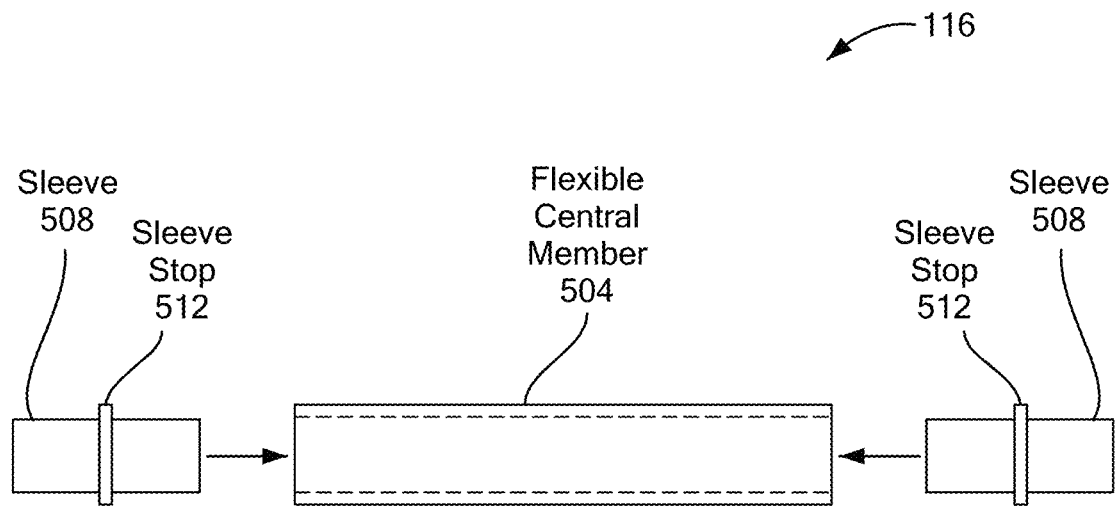
FIG. 5A schematically shows a side view of a handrail connector in accordance with illustrative embodiments of the invention.
Figure 5B:
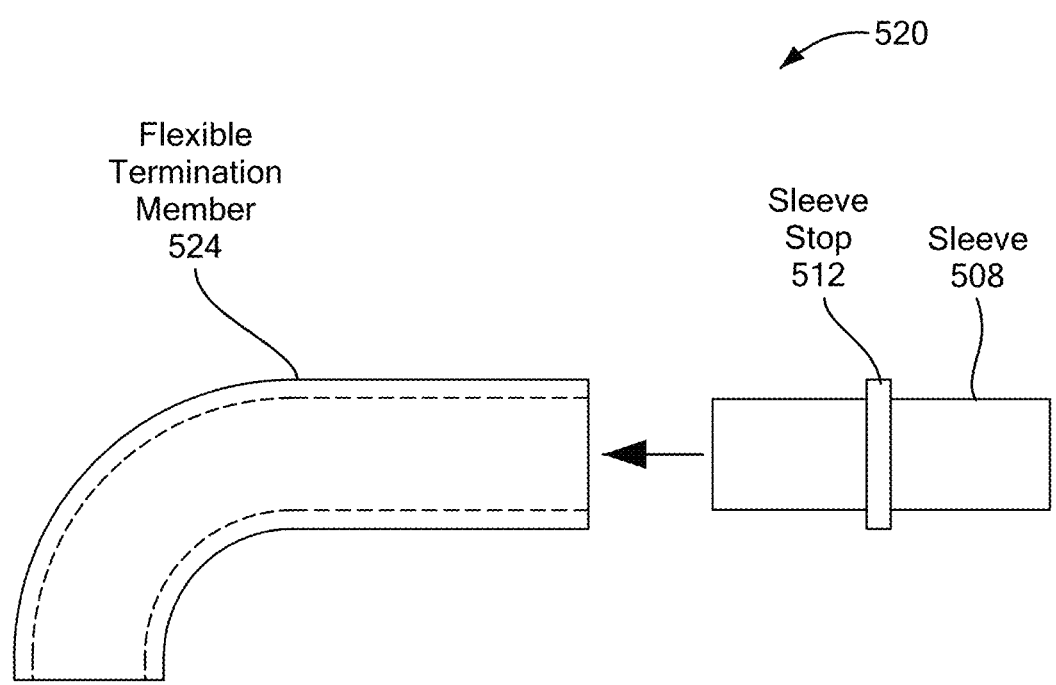
FIG. 5B schematically shows a side view of a handrail terminator in accordance with illustrative embodiments of the invention.

FIG. 4 also shows a pair of handrail supports 304 near the ends of the handrail sections 112 that anchor to a wall 412 and a pair of handrail connector ends 408 that interface each of the handrail sections 112 to the handrail connector 116. In one embodiment, the handrail connector ends 408 may be integral to the handrail connectors 116 while in other embodiments the handrail connector ends 408 may be separate components such as sleeves 508 as shown in FIGS. 5A and 5B. The sleeves 508 embodiment may be preferable because it allows any variable length of handrail connector 116 to be cut to length and used.

FIG. 5A schematically shows a side view of a handrail connector 116 in accordance with illustrative embodiments of the invention. A handrail connector 116 includes a flexible central member 504. The flexible central member 504 is a hollow tubular structure or conduit that directly interfaces with ends of two handrail sections 112 and is typically cut to length for a specific installation. The flexible central member 504 may be any suitable material, including but not limited to natural rubber, synthetic rubber, an elastic polymer, a metal having a high elastic modulus, or the like.

In one embodiment, the flexible central member 504 may include an integrated pair of joints (i.e., handrail connector ends 408) of reduced outside diameter configured to attach the flexible central member 504 to a handrail 112. In certain embodiments, the joints 408 may be provided when the flexible central member 504 is in a butt connector configuration, as shown in FIG. 5A. The flexible central member 504 may be of any length and have any cross-sectional shape (see, for example, FIGS. 9 (A)-(F)). In some embodiments, the flexible central member 504 is made from an elastic material such that a joint may be formed by expanding the elastic material around the end of a handrail 112 (not shown). In some embodiments, the flexible central member 504 may be a non-plastic (i.e., inelastic) material having the joint formed during production.

In another embodiment, a separate sleeve 508 may be inserted into one end or each end of the flexible central member 504 as the handrail connector ends 408. For example, a flexible central member 504 may have a handrail connector end 408 at a first end and receive a sleeve 508 at the second end. The other end of each sleeve 508 fits within a receiving space in the end of each handrail section 112. Therefore, each sleeve 508 may have a narrower outside diameter than the flexible central member 504 and the handrails or handrail sections 112. Sleeves 508 are not restricted to any particular length but must be long enough to securely interface the flexible central member 504 with the handrail sections 112 while allowing the flexible central member 504 to flex or bend in a different direction than an interfaced handrail 112. Sleeves 508 may be made from a rigid material such as steel, aluminum, carbon fiber, fiberglass, or various plastics including ABS and PC-ABS plastic. The fastening of the sleeve connectors 508 to both the flexible central member 504 and the straight handrail section 112 may be made through the use of a high strength adhesive such as epoxy. The adhesive is applied to the sleeve connector 508 surfaces prior to its being joined on both ends.

In one embodiment, sleeves 508 may be hollow for light weight while in other embodiments sleeves 508 may be solid or blocked at one end. Solid or blocked sleeves 508 may beneficially prevent the curable liquid compound or aggregate described herein from moving within the handrail(s) 112 itself and being wasted (i.e., the curable liquid compound or aggregate material hardens when cured and the handrails 112 are already rigid/hard. Therefore, the handrails 112 do not require the curable liquid compound to become rigid). Where a sleeve 508 is blocked at one end, it may be beneficial to orient the blocked end within the flexible central member 504 as long as fill/inspection holes 604 (see FIG. 6) are not blocked. Sleeves 508 must not interfere with the holes 604 as that will inhibit the desired operation of the handrail connector or terminator. The function and description of the curable liquid compound or aggregate and holes 604 is described with respect to FIG. 6 for handrail connectors and 8A for handrail terminators.

In one embodiment, the sleeves 508 may include a sleeve stop 512 approximately central along its length. Sleeve stops 512 prevent the sleeves 508 from being inserted too far into the flexible central member 504, flexible termination member 524, or handrail 112 and possibly blocking the fill/inspection holes 604 or limiting the bending of the flexible central member 504 or flexible termination member 524. This means the sleeve stops 512 must be positioned to the outside of (i.e., near the ends of the flexible central member 504 or flexible termination member 524) the holes 604. The sleeve stops 512 may include a raised and narrow external projection around the outer periphery of the handrail connection or termination.

In one embodiment, a radially outer edge of a sleeve stop 512 may have a similar appearance as a flexible central member 504, a flexible termination member 524, or one or more handrails 112. The similar appearance may include a color, a texture, a matte or glossy appearance, and the like. The appearance may also be contrasting compared to a flexible central member 504, a flexible termination member 524, or one or more handrails 112. For example, a sleeve 508 may be made from stainless steel and the sleeve stop 512 edge may have a silver or chromed appearance that may contrast and complement a black flexible central member 504, flexible termination member 524, or one or more handrails 112.

In another embodiment, in lieu of using sleeves 508, the flexible central member 504 may be joined to a handrail 112 using typical joining hardware (e.g., a brace, a splint, a clamp, a turnbuckle, or the like). In another embodiment, the flexible central member 504 may be joined to a handrail 112 with an adhesive (e.g., glue, an epoxy resin, adhesive tape, or the like).

FIG. 5B schematically shows a side view of a handrail terminator 520 in accordance with illustrative embodiments of the invention. Handrail terminators 520 may provide a wall 412 termination for a handrail 112. Handrail terminators 520 may include a flexible termination member 524, and optionally, a sleeve 508. The sleeve 508 may interface to an end of a handrail 112, as described with reference to FIG. 5A. The handrail terminator 520 may also interface to a handrail half connector 808, as shown in FIGS. 8A-8E.

In one embodiment, the sleeve 508 may include a sleeve stop 512 around the center. The sleeve stop 512 prevents a sleeve 508 from being inserted too far into the flexible termination member 524 and possibly blocking a fill/inspection hole 604 (See FIG. 8A) or limiting the bending of the flexible termination member 524.

In another embodiment, in lieu of using a sleeve 508, the flexible termination member 524 may be joined to a handrail 112 using typical joining hardware (e.g., a brace, a splint, a clamp, a turnbuckle, or the like). In another embodiment, the flexible termination member 524 may be joined to a handrail 112 with an adhesive (e.g., glue, an epoxy resin, adhesive tape, or the like).

Figure 6:
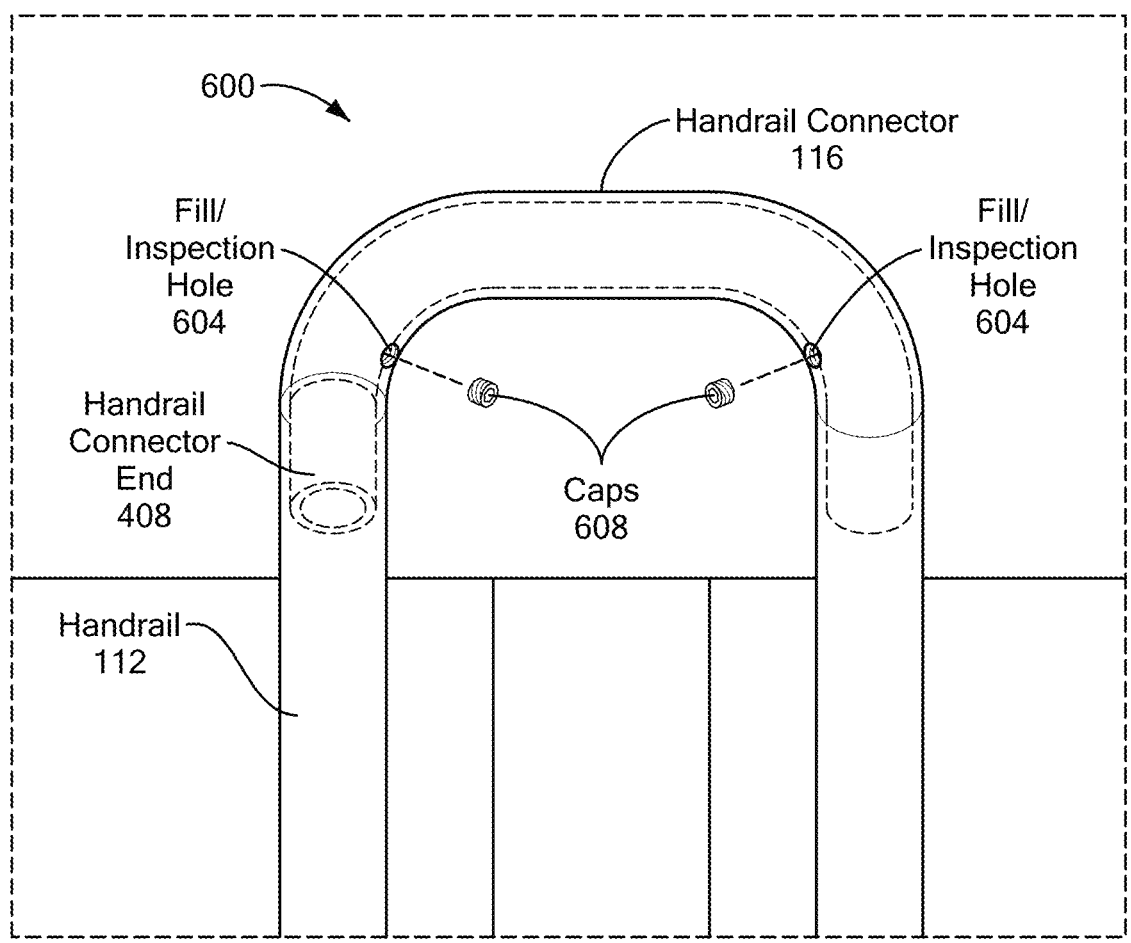
FIG. 6 schematically shows a plan view of an installed handrail connector in accordance with illustrative embodiments of the invention.

FIG. 6 schematically shows a plan view of an installed handrail connector 600 in accordance with illustrative embodiments of the invention. FIG. 6 illustrates key features of an installed handrail connector 600 installed between a pair of handrails or handrail sections 112, as also previously shown.

Handrail connector 116 may be attached to ends of handrails 112 by a pair of handrail connector ends 408, sleeves 508, or other means as described herein. In the illustrated embodiment, handrail connector ends 408 engage receivers in ends of each handrail 112. They may be secured with an adhesive or adhesive tape as well as mechanical means such as set screws or other fasteners through a side surface of the end of each handrail section 112.

The handrail connector 116 may be formed or bent into various shapes prior to installation, after one end is secured to a handrail 112, or after both ends are secured to two handrails or handrail sections 112. Forming the handrail connector 116 to a desired shape can be performed by hand by placing the handrail connector 116 in a jig or by employing robotics (e.g., computer-aided design (CAD) assisted robotics), or the like. The desired shape can include a volute, a rosette, a curved bend, a dogleg bend, a tangent bend, a gooseneck bend, a pretzel bend, a 45° bend, a 90° bend, or the like.

In some embodiments, an angled bend can range from 1° to 179° (e.g., from 2° to 175°, from 3° to 170°, from 4° to 165°, from 5° to 160°, from 10° to 155°, from 15° to 150°, from 20° to 145°, from 30° to 135°, or from 45° to) 90°, depending on the orientation from the first handrail 112 to the second handrail 112 when joining two handrails 112. The complexity of the bend/shape is related to the orientation of two handrails 112 being joined, the desired design of a termination, or any other factor determining a shape of the flexible connector. For example, a handrail connector 116 may extend from a handrail 112 to a first bend. The first bend may be a 30° upward bend following the contour of a stairway 104. After a determined rise, the handrail connector 116 may bend 90° to be substantially parallel to a stairway 104 or a landing 108. After the 90° bend, the handrail connector 116 may then be rounded to wrap around a corner, a support beam, or the like. In some cases, the handrail connector 116 may then further bend to attach to a second handrail 112 associated with a second flight of stairs.

The handrail connector 116 includes a pair of fill/inspection holes 604 in proximity to ends of the handrail connector 116. In a preferred embodiment, the fill/inspection holes 604 may be located on undersides of the handrail connector 116 when installed to be hidden from people and provide a smoother and continuous unbroken surface as required by universal and building codes. Each fill/inspection hole 604 may have a corresponding cap 608 to cover the fill/inspection holes 604 and provide an improved aesthetic appearance. The caps 608 may be attached with a press-fit or threaded connection or secured with a suitable adhesive. The top surface of the caps 608 may include a tool interface for a screwdriver, Allen key, Torx driver, or any other type of tool. The top surface of the caps 608 may include a texture, a shape, or a profile that complements the handrail connector 116. In one embodiment, a top surface of the caps 608 may be flush with the outer surface of a handrail connector 116 or handrail terminator 520 when installed.

The handrail connector 116 may be filled with a curable liquid compound or aggregate and hardened at the currently bent form/shape. Filling the handrail connector 116 is performed by urging the curable liquid compound or aggregate into a first fill/inspection hole 604. Urging the aggregate into the hole 604 may be performed by any one of gravity feeding, pumping, piping, submerging, pressure filling, pouring, or the like. In certain embodiments, the curable liquid compound or aggregate and hardener can be pre-mixed before filling the handrail connector 116 (e.g., with an aggregate such as cement). As such, the hardener may include a polymerization catalyst, a desiccant, or the like.

In some embodiments, the curable liquid compound or aggregate may harden by cooling or exposure to ultraviolet (UV) light. Hardening the aggregate may also be performed by any one of thermosetting, air curing, drying, or the like. For example, when the curable liquid compound or aggregate is an epoxy resin, the epoxy resin may be mixed before being urged into a hole 604 (e.g., pre-mixed). The components of the epoxy resin (e.g., the resin and the hardener) may react and cure without outside stimulus (e.g., no heat may be required to harden the epoxy resin). In some cases, e.g., when the curable liquid compound or aggregate is a thermoset polymer, hardening may be performed by heating the formed handrail connector 116 for a time and temperature consistent with the employed polymer. Likewise, when the curable liquid compound or aggregate is a UV curable polymer, the UV curable polymer may be exposed to UV light for a prescribed time. Additionally, in the example of a UV-curable polymer, the handrail connector 116 may be preferably at least translucent and more preferably transparent to UV light (e.g., the (unpainted) handrail connector 116 or handrail terminator 520 may allow UV light to pass through). In some examples, a molten metal may be poured into a hole 604 of the handrail connector 116 or handrail terminator 520, provided the melting temperature ($T_m$) of the handrail connector 116 is greater than the $T_m$ of the molten metal. Thus, cooling the curable liquid compound or aggregate (e.g., the molten metal) may be performed by cooling the curable liquid compound or aggregate. In some embodiments, the curable liquid compound or aggregate may bond directly to the handrail 112 (e.g., when the curable liquid compound or aggregate is an epoxy resin). In all cases, the curable liquid compound or aggregate is continued to be urged or pushed into the injection hole 604 until it is at least visible in the other fill/inspection hole 604. Preferably, the curable liquid compound or aggregate completely fills the handrail connector 116 or handrail terminator 520 before the caps 608 are secured. The other hole 604, while providing a verification means for substantially filling the handrail connector 116 or handrail terminator 520, also allows air to escape as the handrail connector 116 or handrail terminator 520 is being filled. This reduces back pressure and reduces the required effort and pressure to urge all of the curable liquid compound or aggregate within the handrail connector 116 or handrail terminator 520.

In some embodiments, the handrail connector 116 or handrail terminator 520 may be sacrificial. In other words, the handrail connector 116 or handrail terminator 520 may be configured to hold a formed shape while the curable liquid compound or aggregate hardens, and then be removed-revealing the (for example) hardened aggregate. In other embodiments, the handrail connector 116 or handrail terminator 520 may include both functional and/or ornamental features.

For example, the handrail connector 116 or handrail terminator 520 may have an internal texture or features (e.g., ridges, scallops, crosshatches, bumps, etc.) that matches an external texture or features of handrails or handrail sections 112. In order to have a continuous and unbroken flow of common texturing or features, the inside diameter or cross-sectional size of the handrail connector 116 or handrail terminator 520 may be slightly greater than the outside diameter or cross sectional size of the handrail or handrail sections 112. After liquid compound or aggregate curing, the handrail connector 116 or handrail terminator 520 is mechanically (cutting, scraping, grinding, etc.) or chemically (acid or other etching, etc.) removed. This may result in an unbroken sequence of handrails 112, handrail connectors 116, and/or handrail terminations 520 having a common shape, size, texture, and/or surface features. The commonality may be enhanced by painting, plating, or otherwise finishing the exposed surfaces with a common or complementary aesthetic treatment.

In one embodiment, a handrail connector 116 or handrail terminator 520 may have a translucent or transparent appearance. A light source within the handrail connector 116 or handrail terminator 520 may be visible to a person using the handrail 112. This may beneficially indicate an ending of a handrail 112 in dimly lit or night areas. Light sources may be single brightness, variable brightness, changing brightness, single color, multiple colors, and/or changing colors. A light source may be powered by continuous AC or DC power provided through the handrail 112 or by an internal battery. In one embodiment, the handrail connector 116 or handrail terminator 520 may be made from a luminescent material or have a luminescent outer layer or sleeve (e.g., such as with grippable surface 724 shown in FIG. 7B).

Figure 7A:
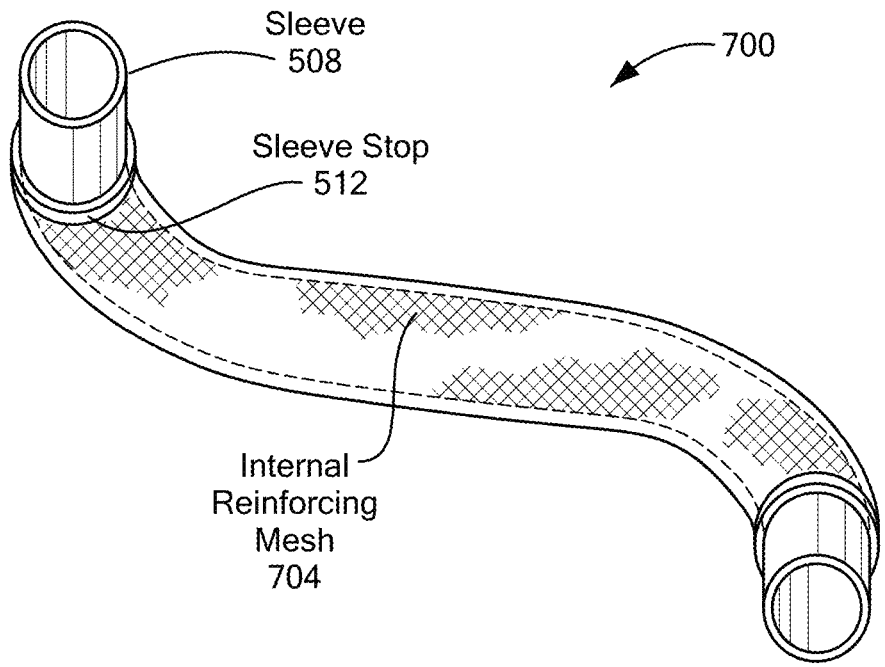
FIG. 7A schematically shows an end view of a reinforced handrail connector in accordance with illustrative embodiments of the invention.

FIG. 7A schematically shows an end view of a reinforced handrail connector 700 in accordance with illustrative embodiments of the invention. FIG. 7A illustrates an optional internal reinforcing mesh 704 within the handrail connector 700. The internal reinforcing mesh 704 assists the handrail connector 700 to hold a shape after being bent and while the curable liquid compound or aggregate hardens. Depending on the material chosen for the handrail connector 700, the internal reinforcing mesh 704 may not be required or desirable. However, if the internal reinforcing mesh 704 is used, it must not block the curable liquid compound or aggregate as it flows/is pushed through holes 604 of the handrail connector 700 or handrail terminator 520.

In another embodiment of a handrail connector 116, a handrail connector 116 may provide decorative functionality. As such, the handrail connector 116 may be joined to the terminal end of a first handrail 112, filled with the liquid compound or aggregate, and shaped into a desired shape such as a spiral, a knot, a twist, a volute, or the like. Then the other end of the handrail connector 116 may be coupled to another handrail or handrail section 112. In another embodiment, internal surfaces of the handrail connector 116 may be curved, fluted, splined, textured, or otherwise shaped such that the handrail connector 116 may be removed by cutting away or chemical means to leave the shaped hardened aggregate or liquid compound visible. This shaped handrail connector 116 or handrail terminator 520 may be painted, plated, smoothed/sanded, or otherwise finished.

Figure 7B:
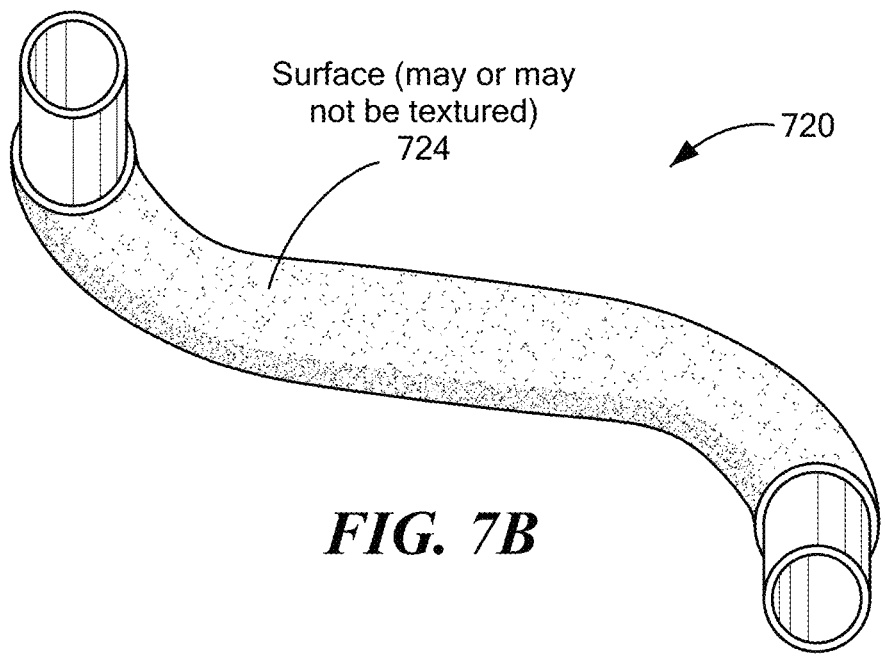
FIG. 7B schematically shows an end view of a handrail connector with a grippable exterior surface in accordance with illustrative embodiments of the invention.

FIG. 7B schematically shows an end view of a handrail connector with a grippable exterior surface 720 in accordance with illustrative embodiments of the invention. In one embodiment, the handrail connector 720 or handrail terminator 520 may have an exterior texture or be coated as a grippable surface 724 to provide enhanced grip for users (e.g., having a high coefficient of friction) and/or an aesthetically appealing appearance. For example, the enhanced grip coating may include grip tape, grit paint, rubber, or the like. The aesthetically appealing coating may include paint, veneer, a decorative paper coating, decorative tape, or the like. In another embodiment, the grippable surface 724 may be provided by a separate sleeve that is slid over the exterior surface of the handrail connector 116 or handrail terminator 520. For example, a section of a heat-shrinkable tubing may provide a tacky surface that facilitates a non-slip grip for users.

Figure 8B:
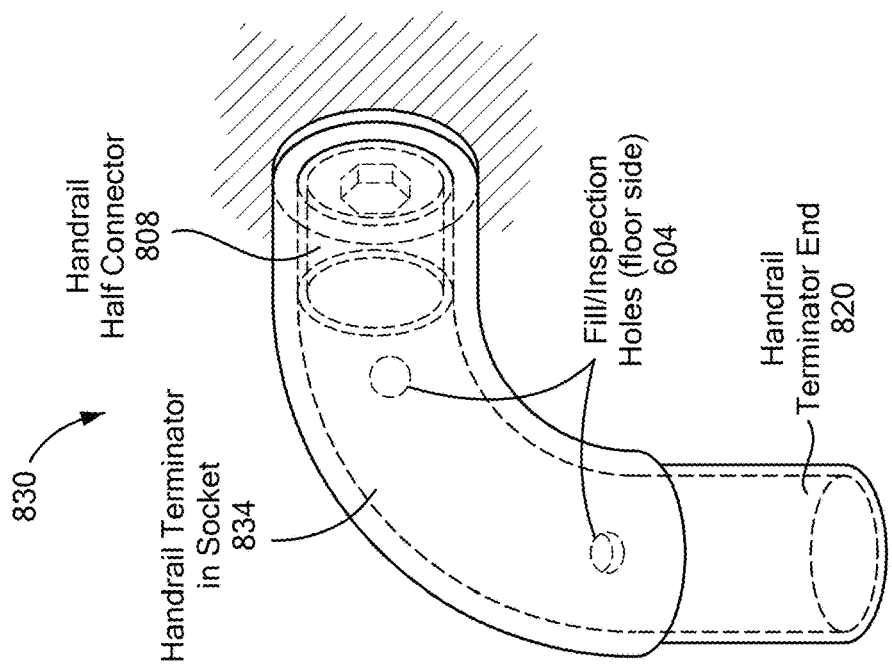
FIG. 8B schematically shows an assembled isometric view of a wall termination of a handrail terminator in accordance with illustrative embodiments of the invention.
Figure 8A:
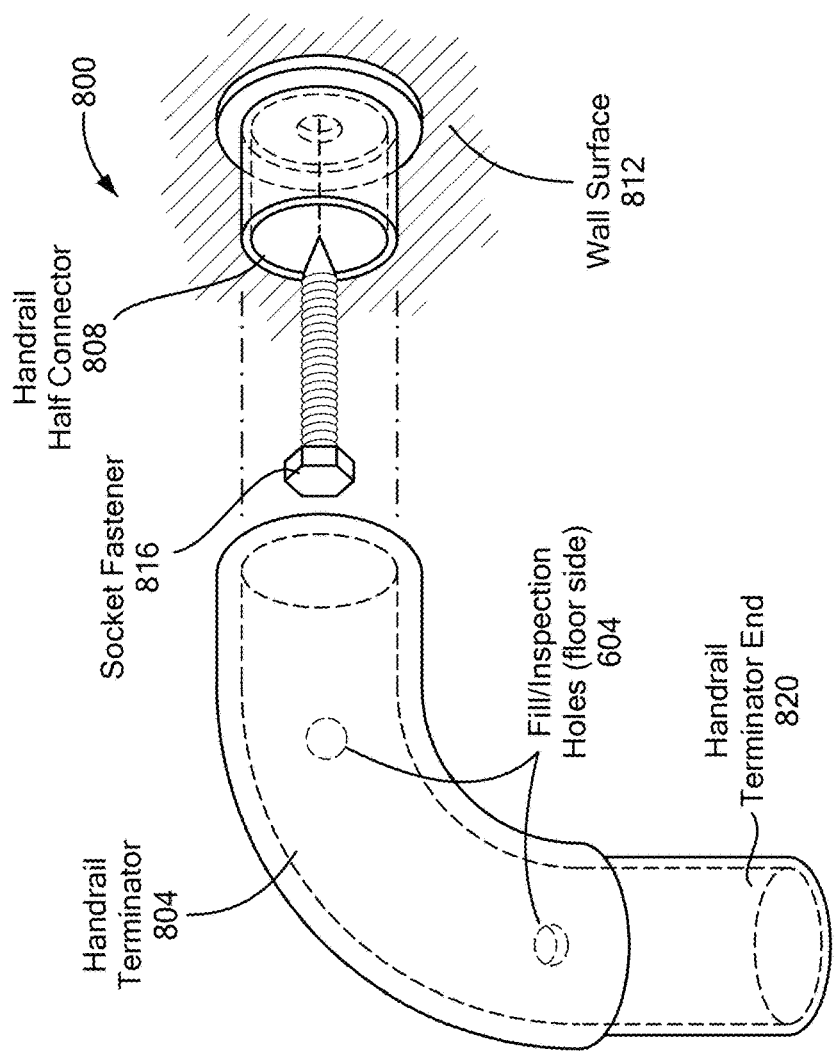
FIG. 8A schematically shows an exploded isometric view of a wall termination of a handrail terminator in accordance with illustrative embodiments of the invention.

FIG. 8A schematically shows an exploded isometric view of a wall termination of a handrail terminator 800 in accordance with illustrative embodiments of the invention. In many areas, building codes require handrail termination into an adjacent wall surface 812. Handrail terminations 800 may be required if a handrail connector 116 is not used to connect a first handrail or handrail section 112 to a second handrail or handrail section 112.

Because a handrail termination is only interfaced to a single handrail 112 at one end, one handrail terminator end 820 is provided. In one embodiment, the handrail terminator end 820 may be a separate component such as a sleeve 508. In that case, the handrail terminator end 820 attaches to a handrail 112 as previously discussed with respect to a handrail connector 116. In another embodiment, the handrail terminator end 820 may be integral to the handrail terminator 804, as previously discussed with respect to the handrail connector end 408.

The handrail terminator 804 provides a curved or angled shape that faces the adjacent wall surface 812 and engages a handrail half sleeve connector 808 affixed to the wall surface 812. The handrail half sleeve connector 808 is affixed to the wall surface 812 by a fastener 816. The fastener 816 may include a wood screw, an expansion bolt, a drywall screw, and/or may include any suitable strong adhesive. The handrail half sleeve connector 808 may be formed as a single component or multiple components. Although the handrail half sleeve connector 808 and fastener 816 provide a secure attachment to the wall surface 812, it is understood that other handrail supports 304 anchor the handrail to the wall 4 surface 812 at specified intervals.

In one embodiment, the handrail terminator 804 may include a sleeve stop 512 (see FIG. 5B, part of exterior of sleeve 508) near the handrail terminator end 820 to prevent a sleeve 508 from inserting too far into the handrail terminator 804. However, because the handrail terminator 804 has a turn radius or angle away from the handrail terminator end 820, a sleeve 508 may be stopped from excess insertion within the handrail terminator 804 without requiring a sleeve stop 512.

In one embodiment, the handrail terminator 804 may include an internal plugged surface (not shown) extending through the width of the handrail terminator near the wall end of the handrail terminator 804. The plugged surface is preferably recessed within the end of the handrail terminator 804 a sufficient distance to clear an outwardly-projecting head of an installed fastener 816. The plugged surface is to the outside of the nearest fill/inspection hole 604 and blocks injected curable liquid compound or aggregate from entering the handrail half-connector 808 and surrounding a head of the fastener 816. This may make handrail terminator 804 servicing and repair easier.

Like the handrail connector 116, the handrail terminator 804 may include a pair of fill/inspection holes 604 and caps 608 (caps 608 not shown). A same process for filling the handrail termination 804 as the handrail connector 116 with a curable liquid compound or aggregate using the holes 604 should be followed. FIG. 8B schematically shows an assembled isometric view of a wall termination of a handrail terminator 830 in accordance with illustrative embodiments of the invention. FIG. 8B illustrates the general appearance of a completed and installed handrail termination 520. The connection to a handrail or handrail section 112 is not shown for clarity. The handrail terminator 804 is secured to the handrail half connector 834.

FIG. 8C schematically shows a handrail terminator end installed to a handrail 840 in accordance with illustrative embodiments of the invention. The handrail half sleeve connector 808 is secured to the wall surface 812 with the fastener 816. The handrail or handrail section 112 is secured to the wall surface 812 by a number of handrail supports 304. After or while the handrail terminator end 820 is secured to the handrail 112, the free end of the handrail terminator 804 is seated to the handrail half sleeve connector 808. It may be necessary to first loosen fasteners for one or more handrail supports 304 to allow the handrail 112 end and handrail terminator 804 to clear a lip of the handrail half sleeve connector 808.

FIG. 8D schematically shows an assembled plan view of a wall termination of a handrail terminator 850 in accordance with illustrative embodiments of the invention. It may be necessary to loosen or remove fasteners between one or more handrail supports 304 and a handrail 112 to allow the handrail terminator 804 to clear the handrail half connector 808. Once the handrail terminator 804 is connected to the handrail half connector 808, the fasteners for the handrail supports 304 may be reinstalled.

Figure 8E:
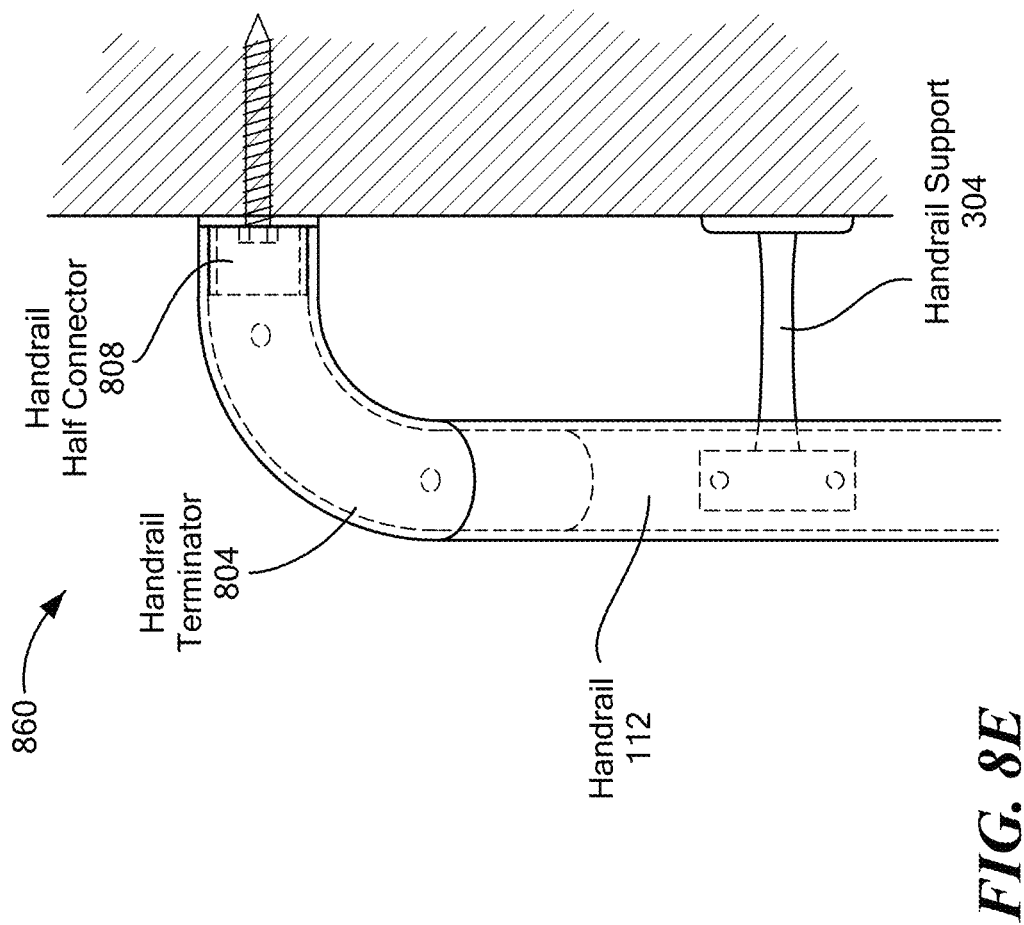
FIG. 8E schematically shows an assembled plan view of a handrail terminator in accordance with illustrative embodiments of the invention.

FIG. 8E schematically shows an assembled plan view of a handrail terminator 860 in accordance with illustrative embodiments of the invention. FIG. 8E illustrates a fully installed handrail termination and main components including a handrail support 304, the handrail 112, the handrail terminator end 820 (which may be a sleeve 508), the handrail terminator 804, the Handrail half connector 808, and a pair of caps 608 in the fill/inspection holes 604.

In another embodiment of handrail termination, instead of attaching the handrail termination 804 to a wall surface 812 as shown in FIGS. 8A-8E, a handrail terminator 804 may provide decorative functionality for handrail termination. For example, internal surfaces of the handrail terminator 804 may be curved, fluted, splined, textured, or otherwise shaped such that the handrail terminator 804 may be removed by cutting away or by chemical means to leave the hardened aggregate or cured liquid compound visible with a decorative shape or texture to match or contrast with handrails 112.

FIG. 9(A)-(F) schematically shows exemplary handrail and handrail connector cross sections in accordance with illustrative embodiments of the invention.

Figure 9A:
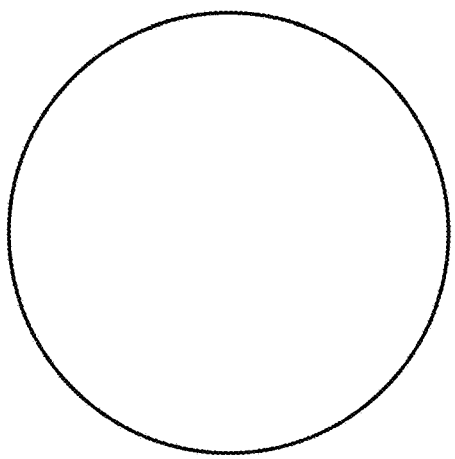
FIG. 9A-9F schematically shows exemplary handrail and handrail connector cross sections in accordance with illustrative embodiments of the invention.
Figure 9B:
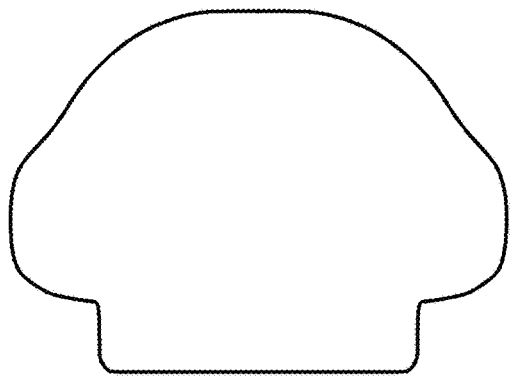
Figure 9C:
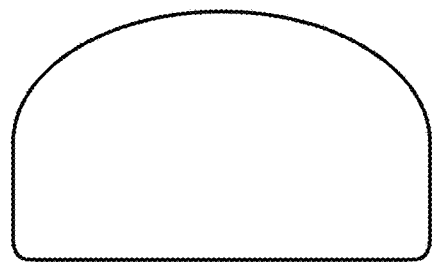
Figure 9D:
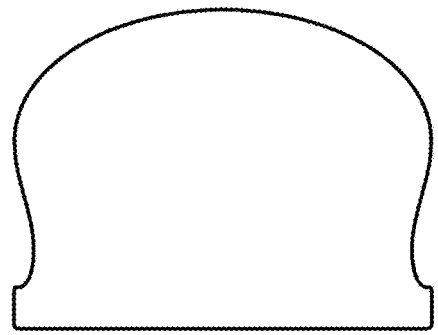
Figure 9E:
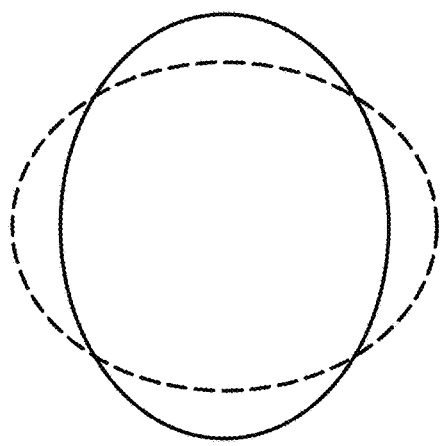
Figure 9F:
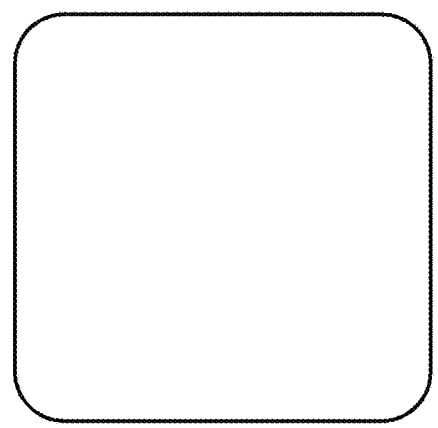

FIG. 9A illustrates a round or circular cross section. FIG. 9B illustrates a compound curve cross section with rear finger grab areas. FIG. 9C illustrates a half-round cross section. FIG. 9D illustrates a compound curve cross section with intermediate finger grab areas. FIG. 9E illustrates an oval cross section in either a vertical or horizontal disposition. FIG. 9F illustrates a square cross section with rounded corners. Countless other possible cross sections may be used, including geometric, non-geometric, oval, regular and irregular, and other cross sections. In some embodiments, handrails 112, handrail connectors 116, and handrail terminators 520 may include multiple cross sections with abrupt or smooth transitions between adjacent sections.

Figure 10:
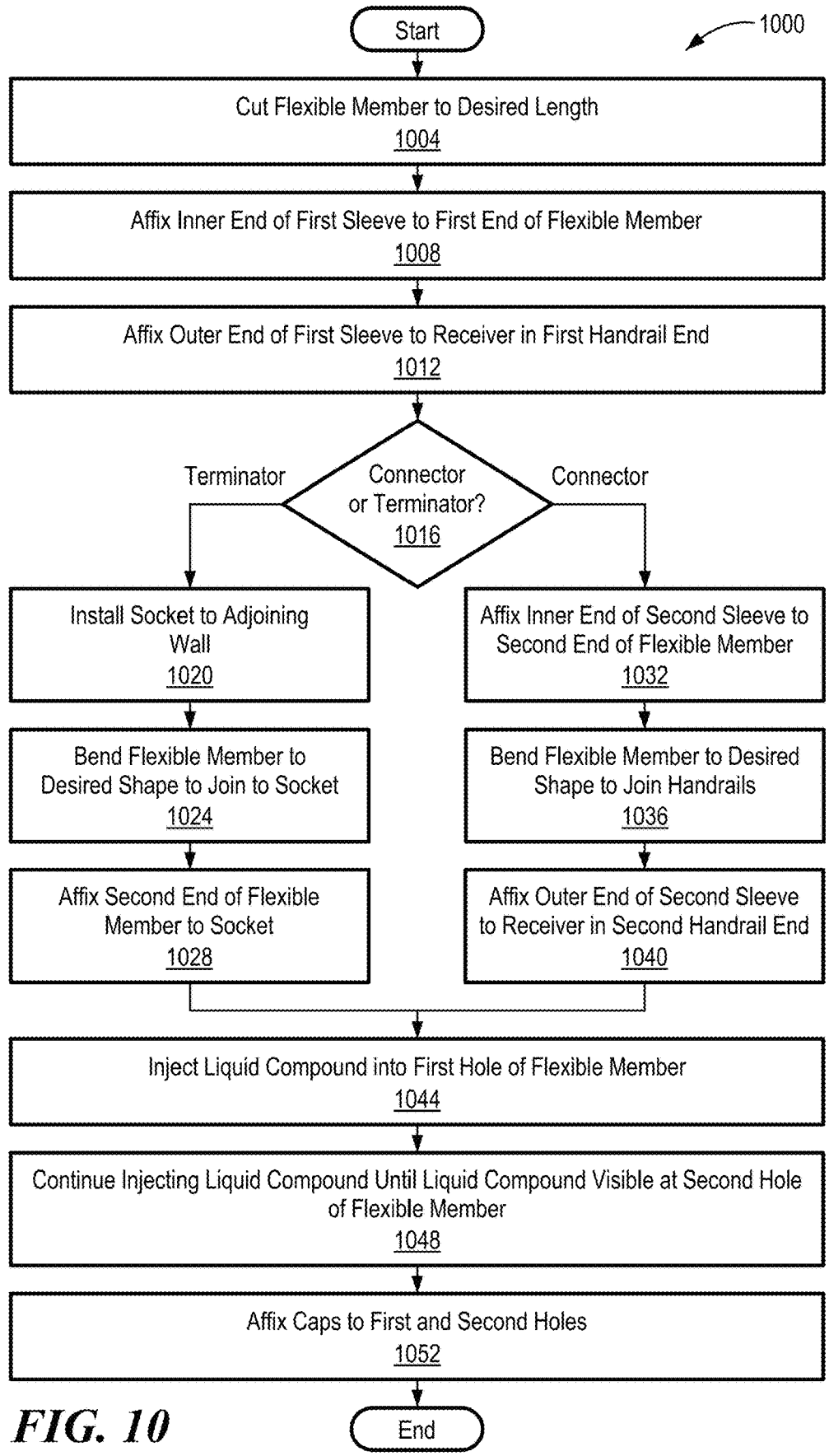
FIG. 10 shows a flowchart illustrating a handrail connector or terminator installation process in accordance with illustrative embodiments of the invention.

FIG. 10 shows a flowchart illustrating a handrail connector or terminator installation process 1000 in accordance with illustrative embodiments of the invention. Flow begins at block 1004.

At block 1004, the flexible member 504 or termination member 524 is cut to a desired length. The length may be specified in order to allow the flexible connector to achieve an optimal shape automatically without the visual judgement of the installer. The greatest installation flexibility may be achieved by a flexible member 504 or termination member 524 that is cut to length depending on spacing between adjacent handrails 112 or between an end of a handrail 112 and a handrail half sleeve connector 808. This allows the flexible member 504 or termination member 524 material on spools or in longer lengths to be efficiently stored. Alternately, the flexible member 504 or termination member 524 may be provided in one or more standard lengths that do not need to be cut further, and this step may be avoided. Flow proceeds to block 1008.

At block 1008, an inner end of a first sleeve 508 is affixed or coupled to a first end of the flexible member 504 or termination member 524. The sleeve 508 is rigid to provide a secure interface between flexible member 504 or termination member 524 and an end of a handrail 112. The sleeve 508 may be attached as a press-fit connection, threaded between the sleeve 508 and the flexible member 504 or termination member 524, a soldered connection, a glued connection, a twist-lock connection, or any other type of connection. The first sleeve 508 may include a sleeve stop 512. Flow proceeds to block 1012.

At block 1012, an outer end of the first sleeve 508 is affixed or coupled to a receiver in an end of a first handrail 112. The fixing of the coupling may be achieved using a structural adhesive such as epoxy. Each handrail 112 includes a receiving space ("receiver") that accepts an outside end of a sleeve 508. The method of coupling between the first sleeve 508 and the receiver may be the same as or different than coupling between the first sleeve 508 and the flexible member 504 or termination member 524. Flow proceeds to decision block 1016.

At decision block 1016, a decision is made as to whether the assembly is for a handrail connector 116 between handrail 112 sections or a handrail terminator 520 between a handrail 112 and a handrail half sleeve connector 808. If the assembly is for a handrail terminator 520 between a handrail 112 and a handrail half sleeve connector 808, then flow proceeds to block 1020. If the assembly is for a handrail connector 116 between handrail 112 sections, then flow instead proceeds to block 1032.

At block 1020, a handrail half sleeve connector 808 is installed to an adjoining wall 412. This is explained in more detail with respect to FIGS. 8A-8E. Flow proceeds to block 1024.

At block 1024, the flexible termination member 524 is bent to a desired shape and bend radius to join to the handrail half sleeve connector 808. The length may be specified to allow the flexible connector to achieve an optimal shape automatically without the visual judgement of the installer. At this step, a grippable sleeve 724 may be slid onto the flexible termination member 524 to provide improved hand purchase to the handrail terminator. This may be secured by heat treatment, an adhesive, or other attachment processes. Flow proceeds to block 1028.

At block 1028, the second end of the flexible termination member 524 (i.e., the opposite end from the first sleeve 508) is affixed or coupled to the handrail half sleeve connector 808. Alternately, a second sleeve 508 may be attached to the other end of the flexible termination member 524, and the second sleeve 508 may be affixed or coupled to the handrail half sleeve connector 808. Flow proceeds to block 1044.

At block 1032, an inner end of a second sleeve 508 is affixed or coupled to a second end of the flexible member 504. The method of coupling between the second sleeve 508 and the receiver may be the same as or different than coupling between the first sleeve 508 and the flexible member 504. Flow proceeds to decision block 1036.

At block 1036, the flexible member 504 is bent to a desired shape and bend radius to join to a receiver of a second handrail 112. The length may be specified in order to allow the flexible connector to achieve an optimal shape automatically without the visual judgement of the installer. At this step, a grippable sleeve 724 may be slid onto the flexible member 504 to provide improved hand purchase to the handrail connector 116. This may be secured by heat treatment, an adhesive, or other attachment processes. Flow proceeds to block 1040.

At block 1040, an outer end of the second sleeve 508 is affixed or coupled to the receiver in the end of a second handrail 112. The method of coupling between the second sleeve 508 and the receiver may be the same as or different than coupling between the first sleeve 508 and the flexible member 504. Flow proceeds to decision block 1044.

At block 1044, a curable liquid compound or aggregate is injected into a first hole 604 of the flexible member 504 or flexible termination member 524. The curable liquid compound or aggregate has a certain setup time before it hardens—therefore, all of the curable liquid compound or aggregate must be injected throughout the flexible member 504 or flexible termination member 524 before it hardens. Flow proceeds to block 1048.

At block 1048, the curable liquid compound or aggregate continues to be injected into the first hole 604 until the curable liquid compound or aggregate flows through the flexible member 504 or flexible termination member 524 and is visible at or occupies the second hole 604. Preferably, the curable liquid compound or aggregate makes contact with the bottom of the second hole 604. Flow proceeds to block 1052.

At block 1052, caps 608 are affixed to the first and second holes 604. In one embodiment, the caps 608 are affixed with a press-fit connection. In another embodiment, the caps 608 are threaded and engage matching threads on the inside of the holes 604. In other embodiments, caps 608 may be glued in place, be affixed magnetically, or affixed through other means. Flow ends at block 1052.

At this point, the flexible member 504 or flexible termination member 524 may be painted, plated, or finished to match handrails 112 or other decorative features.

Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A handrail connector, the handrail connector comprising:
    a hollow lengthwise member configured to retain flexibility when empty, the member having an inner reinforcement mesh, first and second opposing ends, and a side surface, the first end having a first hole proximate the side surface, the second end having a second hole proximate the side surface;
    a first sleeve having a first sleeve end and a second sleeve end, the first sleeve end configured to couple with the first end of the member, the second sleeve end configured to couple with a first handrail; and
    a second sleeve having a third sleeve end and a fourth sleeve end, the third sleeve end configured to couple with the second end of the member, the fourth sleeve end configured to couple with one of a half sleeve and a second handrail,
    wherein the member is configured to become more rigid than when empty in response to a liquid compound injected into the first hole fills the second hole and hardens,
    wherein the inner reinforcement mesh is configured to allow the liquid compound to flow within the mesh and permit the hollow lengthwise member to be bent in one or more directions.

2. The handrail connector of claim 1, wherein the inner reinforcement mesh is configured to maintain a cross sectional shape of the hollow lengthwise member and preserve the bend directions prior to the liquid compound is injected.

3. The handrail connector of claim 1, further comprising:
    a pair of caps, configured to plug the first and second holes.

4. The handrail connector of claim 3, wherein the caps are not secured to the first and second holes until the liquid compound is observed within the second hole.

5. The handrail connector of claim 1, wherein the first and second sleeves are made from a rigid material.

6. The handrail connector of claim 1, wherein the fourth sleeve end is configured to be retained in the half sleeve coupled to a wall.

7. The handrail connector of claim 1, wherein the hollow lengthwise member has one of a textured external surface and a resilient sleeve affixed to a portion of the external surface.

8. A handrail connector, comprising:
    a hollow lengthwise member configured to retain flexibility when empty, comprising:
        a central portion, comprising:

a pair of holes proximate to opposite ends of the central portion and disposed in a side surface of the central portion;

a first sleeve portion of a reduced cross section compared with the central portion, extending from a first end of the central portion and configured to be received in an end of a first handrail; and an inner reinforcement mesh configured to permit the central portion to be bent in one or more directions; and a second sleeve portion of a reduced cross section compared with the central portion, extending from an opposite second end of the central portion, wherein the member is configured to become more rigid than when empty in response to a liquid compound injected into one of the pair of holes fills the other of the pair of holes and hardens, wherein the inner reinforcement mesh is configured to allow the liquid compound to flow within the mesh.

9. The handrail connector of claim 8, wherein the inner reinforcement mesh is configured to maintain a cross sectional shape of the central portion and preserve the bend directions prior to the liquid compound is injected.

10. The handrail connector of claim 8, further comprising:
a pair of caps, configured to plug each of the pair of holes, wherein the caps are not secured to the holes until the liquid compound is observed within the other of the pair of holes.

11. The handrail connector of claim 8, wherein the central portion has one of a textured external surface and a resilient sleeve affixed to a portion of the external surface.

12. The handrail connector of claim 8, wherein the second sleeve portion is configured to be received in an end of a second handrail.

13. The handrail connector of claim 8, wherein the second sleeve portion is configured to be retained in a half sleeve coupled to a wall.

14. A method, comprising:
coupling an inner end of a pair of sleeves to each end of a hollow lengthwise member, the member comprising a pair of holes proximate to opposite ends of the member and disposed in a side surface of the member;

bending the member in one or more directions to align outer ends of the pair of sleeves with a first receiver in an end of a first handrail and a second receiver;

coupling an outer end of each of the pair of sleeves to the first and the second receivers; and injecting a liquid compound into one of the pair of holes until it fills the other of the pair of holes and hardens.

15. The method of claim 14, further comprising:
verifying the liquid compound is visible at the other of the pair of holes, in response to the injecting; and closing the pair of holes with a pair of caps.

16. The method of claim 14, wherein the second receiver is in an end of a second handrail.

17. The method of claim 14, wherein the second receiver is in a half sleeve coupled to a wall.

18. The method of claim 14, further comprising:
attaching a non-slip sleeve over the member prior to affixing the outer end of each sleeve to one or more of the first and the second receivers.

19. The method of claim 14, wherein hollow lengthwise member is flexible prior to injecting the liquid compound and rigid after the liquid compound hardens.

20. The method of claim 14, wherein the member further comprises:
inner reinforcement mesh, configured to allow the liquid compound to flow within the mesh, permit the member to be bent in one or more directions, maintain a cross sectional shape of the member, and preserve the bend directions prior to the liquid compound is injected.

* * * * *